United States Patent [19]

Nishiguchi

[11] Patent Number: 5,475,789
[45] Date of Patent: Dec. 12, 1995

[54] METHOD OF COMPRESSING AN AUDIO SIGNAL USING ADAPTIVE BIT ALLOCATION TAKING ACCOUNT OF TEMPORAL MASKING

[75] Inventor: Masayuki Nishiguchi, Kanagawa, Japan

[73] Assignee: Sony Corporation, Japan

[21] Appl. No.: 26,562

[22] Filed: Mar. 4, 1993

[30] Foreign Application Priority Data

Mar. 6, 1992 [JP] Japan .................................. 4-049720

[51] Int. Cl.$^6$ ....................................... G10L 5/00
[52] U.S. Cl. ........................... 395/2; 395/2.38; 395/2.39; 381/30
[58] Field of Search .............................. 395/2, 2.1, 2.35, 395/2.36, 2.38, 2.39; 381/30

[56] References Cited

U.S. PATENT DOCUMENTS

| | | | |
|---|---|---|---|
| 5,040,217 | 8/1991 | Brondenburg et al. ................ | 395/2.35 |
| 5,185,800 | 2/1993 | Mahieux .................................... | 381/30 |
| 5,241,603 | 8/1993 | Akagiri et al. .......................... | 381/30 |
| 5,285,498 | 2/1994 | Johnston ................................. | 395/2.35 |
| 5,317,672 | 5/1994 | Crossman et al. ...................... | 395/2.38 |

*Primary Examiner*—Allen R. MacDonald
*Assistant Examiner*—Thomas J. Onka
*Attorney, Agent, or Firm*—Limbach & Limbach; Ian Hardcastle

[57] ABSTRACT

An audio signal is coded by converting the audio signal into a signal in a frequency domain and effecting a big allocation on the converted audio signal. A masking threshold level for reducing aurally recognized noise due to a masking effect is determined using a signal spectral distribution in a present frame and a signal spectral distribution in a past frame. If the difference between the determined masking threshold level and a masking threshold level in the past frame is equal to or greater than a predetermined level, then a level limited to the difference corresponding to the predetermined level is regarded as a masking threshold level in the present frame.

3 Claims, 5 Drawing Sheets

Blocks of Adaptive Transform Coding

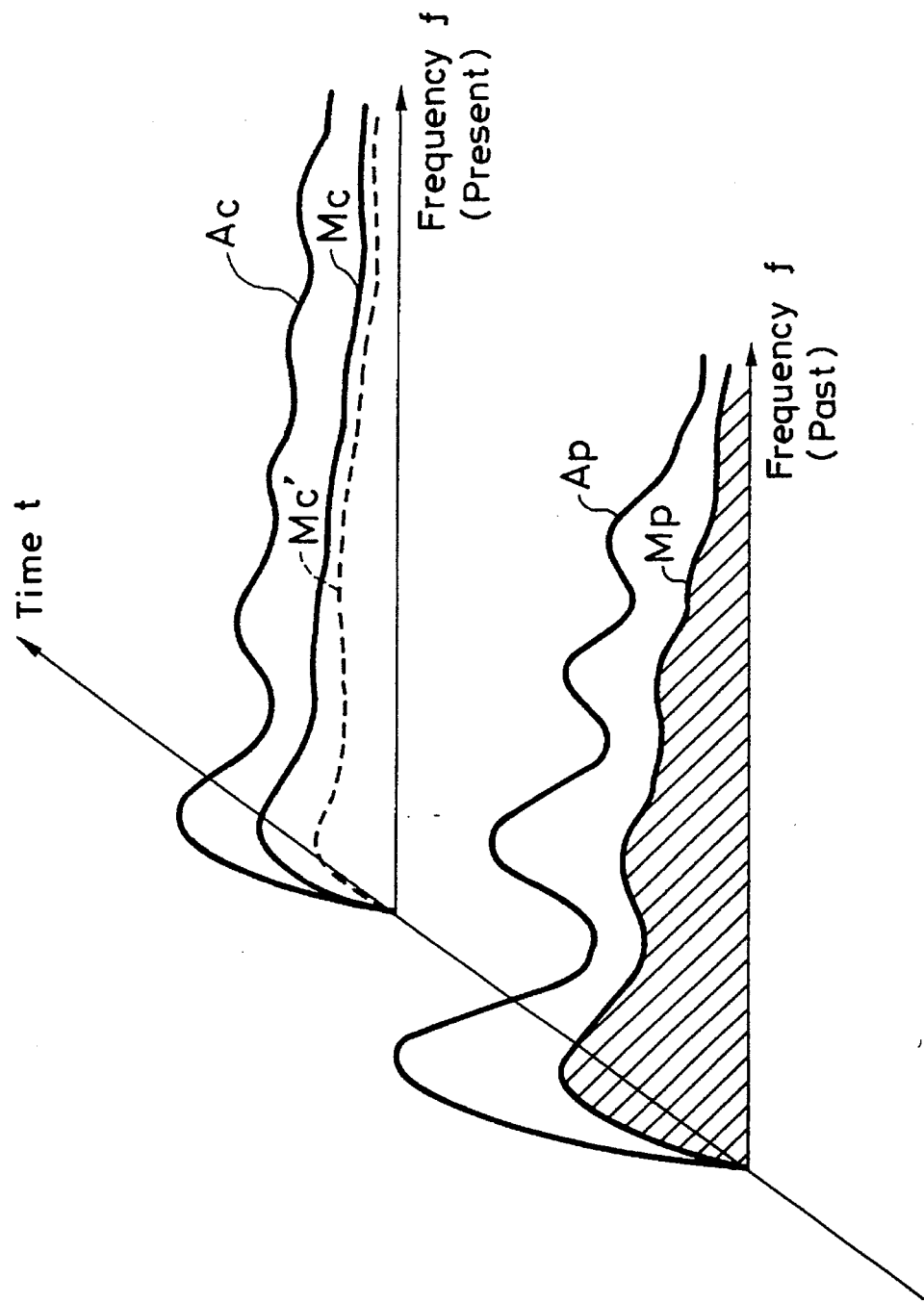
F I G. 4

METHOD OF COMPRESSING AN AUDIO SIGNAL USING ADAPTIVE BIT ALLOCATION TAKING ACCOUNT OF TEMPORAL MASKING

BACKGROUND OF THE INVENTION

1. Field of the Invention

The present invention relates to a method of compressing a digital audio signal with high efficiency prior to transmission.

2. Description of the Prior Art

To compress an audio signal, it is customary to divide the input audio signal into a plurality of channels in time domain or in the frequency domain and adaptively allocate a number of bits to the divided audio signal in each of the channels. In one process, known as subband coding (SBC), the audio signal in the time domain is compressed by dividing it into a plurality of frequency bands among which bit allocation is performed. In adaptive transform coding (ATC), an audio signal in the time domain is converted into a signal in the frequency domain by an orthogonal transform, the resulting spectral coefficients in the frequency domain are divided into a plurality of frequency bands, and the spectral coefficients in each of the frequency bands are adaptively quantized. In yet another process, known as adaptive bit allocation (APC-AB), subband coding (SBC) and adaptive predictive coding (APC) are combined to divide a signal in the time domain into a plurality of frequency bands, and each frequency band signal is converted into a base band (low frequency band), after which linear predictive analyses of plural orders are carried out for predictive coding.

Among the above-mentioned high efficiency compression processes, in adaptive transform coding, an audio signal in the time domain is converted into spectral coefficients in the frequency domain, orthogonal to the time domain, using an orthogonal transform, such as a fast Fourier transform (FFT) or a discrete cosine transform (DCT). The spectral coefficients are then divided into a plurality of frequency bands, and the spectral coefficients in each of the frequency bands are quantized by adaptive bit allocation. One example of the quantizing in adaptive transform coding using a fast Fourier transform is as follows: as shown in FIG. 1 of the accompanying drawings, the spectral amplitudes Am, resulting from subjecting the digital audio signal to the fast Fourier transform, are divided into bands B1, B2, . . . , and the additional information which is required to quantize the amplitudes of the spectral coefficients in each of the bands is calculated. Thereafter, using the calculated additional information, the amplitudes in each of the bands are quantized, and the additional information is also quantized.

With the above the high efficiency compression process in which an audio signal in the time domain is converted into coefficients in a domain orthogonal to the time domain using an orthogonal transform, it is the general practice to determine a masking threshold from the power in each band, and to effect dynamic bit allocation in the frequency domain in a manner that reduces quantizing noise to a level below the level of a masking threshold. The width of each band is determined by the characteristics of the human sense of hearing, i.e., the ability of human beings to perceive sound. By processing the spectral coefficients in each band in the manner described above, the audio signal from which the spectral coefficients are derived is compressed with high efficiency by exploiting the simultaneous masking characteristic of the human sense of hearing.

However, conventional compression processes have not fully exploited the characteristics, such as the masking effect, of the human sense of hearing.

OBJECTS AND SUMMARY OF THE INVENTION

It is an object of the present invention to provide a method of compressing an audio signal with high efficiency to provide a higher compression ratio by exploiting more fully the masking characteristics of the human sense of hearing.

The invention provides a method for compressing a digital audio signal to generate a compressed signal. In the method, plural spectral coefficients in the frequency domain are derived from frames of the digital audio signal. The frames of the digital audio signal include a present frame and a past frame. A masking threshold level, indicating aurally perceived noise taking account of temporal masking, is determined by comparing relative levels of a present masking threshold level calculated using the spectral coefficients derived from the present frame, and a past masking threshold level calculated using the spectral coefficients derived from the past frame. The spectral coefficients derived from the present frame are quantized using a number of quantizing bits allocated among the spectral coefficients derived from the present frame in response to the masking threshold level. Finally, the quantized spectral coefficients derived from the present frame are included in the compressed signal.

The invention also provides a method for compressing a digital audio signal to generate a compressed signal. In the method, plural spectral coefficients in the frequency domain are derived from frames of the digital audio signal. The frames of the digital audio signal include a present frame and a past frame. Masking threshold levels, indicating aurally-perceived noise taking account of simultaneous masking by the spectral coefficients derived from the frames of the digital audio signal, are calculated. The masking threshold levels include a present masking threshold level for the present frame, calculated using the spectral coefficients derived from the present frame, and a past masking threshold level for the past frame, calculated using the spectral coefficients derived from the past frame. When the past masking threshold level multiplied by a predetermined ratio is equal to or greater than the present masking threshold level calculated in the calculating step, the past masking threshold level multiplied by the predetermined ratio is substituted for the present masking threshold level as the present masking threshold level for the present frame. This additionally takes account of temporal masking in the present frame. The spectral coefficients derived from the present frame are quantized using a number of quantizing bits allocated among the spectral coefficients derived from the present frame in response to the present masking threshold level. Finally, the quantized spectral coefficients derived from the present frame are included in the compressed signal.

The spectral coefficients derived from each frame of the digital audio signal may be grouped by frequency into plural bands. The plural bands include a band that has a band frequency. In this case, a present masking threshold level for the band and a past masking threshold level for the band are calculated using the spectral coefficients in the band, and a predetermined ratio is set for the band. When the past masking threshold for the band, multiplied by the predetermined ratio for the band, is greater than or equal to the present masking threshold for the band, the past masking threshold for the band, multiplied by the predetermined ratio for the band, is substituted for the present masking threshold for band as the present masking threshold level for the band. The predetermined ratio for the band depends on the band frequency. It is less when the band frequency is towards higher frequencies than when the band frequency is towards lower frequencies.

The masking threshold level in the present frame is determined using the masking threshold determined using the signal spectral distribution in the present frame and the masking threshold determined using the signal spectral distribution in the past frame. Therefore, the masking threshold level for the present frame can be established highly efficiently taking account of the temporal masking effect of the signal in the past frame. This enables the bit rate of the compressed signal to be reduced.

Furthermore, if the difference between the masking threshold level of the present frame and the masking threshold level of the past frame is equal to or greater than the predetermined ratio, the masking threshold level of the past frame multiplied by the predetermined ratio is substituted for the masking threshold level of the present frame as the masking threshold level of the present frame. Consequently, the bit rate of the compressed signal is efficiently reduced.

When the masking threshold level is determined for different frequency bands, the predetermined ratio differs, depending on the frequency of the band. The ratio is less towards higher frequencies to take account of the frequency-dependence of temporal masking. Thus, the bit rate of the compressed signal is efficiently reduced without reducing the quality of the audio signal obtained by expanding the compressed signal.

The above and other objects, features, and advantages of the present invention will become apparent from the following description of an illustrative embodiment to be read in conjunction with the accompanying drawings, in which like reference numerals represent the same or similar objects.

BRIEF DESCRIPTION OF THE DRAWINGS

FIG. 4 is a diagram illustrative of the manner in which the masking threshold level is determined taking account of temporal masking.

DETAILED DESCRIPTION OF THE PREFERRED EMBODIMENT

Figure 1:
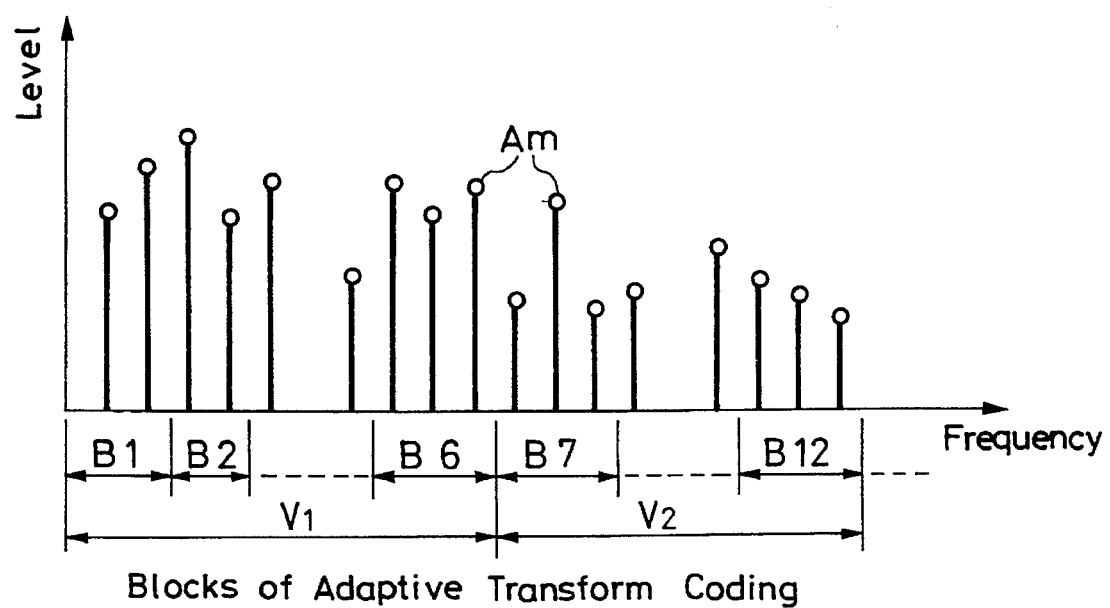
FIG. 1 is a diagram showing blocks of adaptive transform coding in a conventional adaptive transform coding process.
Figure 2:
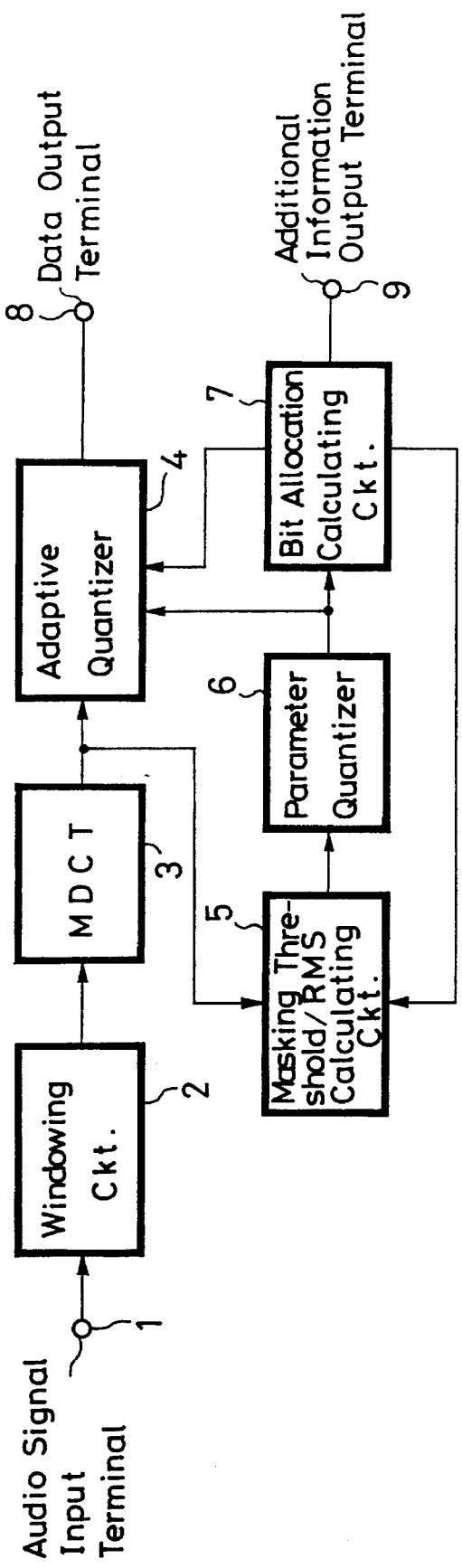
FIG. 2 is a block diagram of the compressor used in the method of compressing an audio signal according to the present invention.
Figure 3:
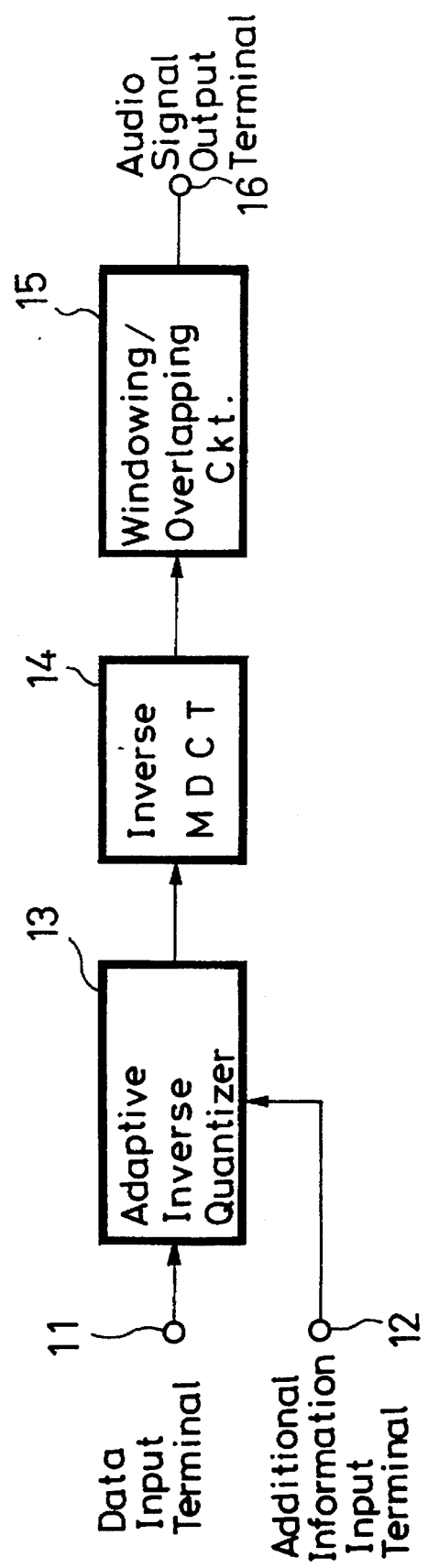
FIG. 3 is a block diagram of the expander used for expanding the compressed signal generated by the method of compressing an audio signal according to the present invention.

The method according to the invention for compressing an audio signal is carried out in a system comprising the audio signal compressor shown in FIG. 2 and the audio signal expander shown in FIG. 3.

The compressor which compresses an audio signal with high efficiency will be described below with reference to FIG. 2. As shown in FIG. 2, the compressor has the audio signal input terminal 1 at which the digital audio signal is received. The received digital audio signal is then applied to the windowing circuit 2, which windows the digital audio signal with a Hamming window of a frame overlap of 50%. Blocks of the windowed signal are then supplied to the modified discrete cosine transform (MDCT) circuit 3, where they are subject to an orthogonal transform using a MDCT. In the illustrated embodiment, the MDCT is performed using a FFT.

The spectral coefficients generated by the MDCT circuit 3 from each block are grouped by frequency into bands and are then supplied to the adaptive quantizer 4. The adaptive quantizer 4 is also supplied with additional information, i.e., a masking threshold level and an RMS value, quantized by the parameter quantizer 6 (described below), and a bit allocation indicating the number of bits to be used for quantizing the spectral coefficients in each band. The bit allocation is calculated by the bit allocation calculating circuit 7 (described below). The adaptive quantizer 4 quantizes each spectral coefficient in each band using the number of bits indicated by the bit allocation for the band.

The spectral coefficients from the MDCT circuit 3 are also supplied to the masking threshold/RMS calculating circuit 5, which calculates a masking threshold level and an RMS value. The masking threshold/RMS calculating circuit 5 calculates the power of the spectrum in each band, and then calculates a masking threshold level and an RMS value based on the power distribution. The procedure for calculating the masking threshold level will be described below in detail.

The calculated masking threshold level and RMS value are supplied to the parameter quantizer 6 which quantizes the masking threshold level and RMS value. The quantized masking threshold level and RMS value are supplied to the adaptive quantizer 4 and the bit allocation calculating circuit 7, which determines, for each band, the bit allocation representing the number of bits to be allotted for quantizing each spectral coefficient in the band. The bit allocation is supplied to the adaptive quantizer 4, which quantizes each spectral coefficient in each band using the number of bits indicated by the bit allocation. The bit allocation is also supplied from the bit allocation calculating circuit 7 to the masking threshold/RMS calculating circuit 5, which then adjusts the bit rate in the calculation of the parameters.

The spectral coefficients quantized by the adaptive quantizer 4 are fed to the main output terminal 8 for transmission over a predetermined transmission line or for recording on a recording device. Simultaneously, the masking threshold level and the RMS value that are quantized by the parameter quantizer 6 are fed as additional information to the additional information output terminal 9 for transmission over the predetermined transmission line or for recording on the recording device.

An example of the signal processing performed by the circuit shown in FIG. 2 will be described next. A series of samples $X(n)$ of an audio signal is supplied to the audio signal input terminal 1, and is divided into blocks by the windowing circuit 2. One block of samples is composed of 1024 samples, thus n in $X(n)$ is in the range of 0~1023. Following processing of a block of samples by the MDCT circuit 3, spectral coefficients $C(k)$ are generated with $k=0$~511 with an overlap of 512, i.e., folded back by 512.

In the equations in the following description, the band spectrum or bark spectrum is indicated by B(i), the spread band by S(i), the masking threshold level by T(i), the masking threshold level that has been compared with an absolute threshold determined from a minimum audible level curve by Tn(i), and the masking threshold level that has been normalized by according to the bandwidth of the band by Tb(i). Since there are 25 bands, i=0~24.

To divide the samples of the audio signal into blocks in the windowing circuit 2, the audio signal is multiplied by a Hamming square-cot window XW(n) that is expressed as follows:

$$XW(n) = X(n) \cdot W(n) \quad n = 0\text{--}1023 \tag{1}$$

where $$W(n) = \sqrt{\left\{ 1 - \cos\pi \frac{n}{N-1} \right\}} \quad \begin{array}{l} n = 0\text{--}511 \\ N = 512 \end{array}$$

$$W(n) = \sqrt{\left\{ 1 - \cos\pi \frac{M-1-n}{N-1} \right\}} \quad \begin{array}{l} n = 512\text{--}1023 \\ N = 512 \\ M = 1024. \end{array}$$

Then, a series of 512 spectral coefficients are determined by the MDCT circuit 3 according to the following equation:

$$C(k) = \sum_{n=a}^{M-1} XW(n)\cos\left\{ \frac{2\pi}{M} \left( k + \frac{1}{2} \right)\left( n + \frac{1}{2} + \frac{M}{4} \right) \right\} \tag{2}$$

$$0 \leq k \leq \frac{M}{2} - 1$$

$$M = 1024$$

The MDCT and inverse MDCT may be carried out using, for example, the fast processing method disclosed in Japanese patent application No. 3-181173 filed by the applicant.

The process of calculating the masking threshold level in the masking threshold/RMS calculating circuit 5 will be described next. First, a band spectrum or bark spectrum B(i) is determined from the spectral coefficients derived from each block of the audio signal according to the following equation:

$$B(i) = \sum_{k=l(i)}^{u(i)} C^2(k) \quad i = 0\text{--}24 \tag{3}$$

where u(i) indicates the upper limit of each critical band and l(i) the lower limit of each critical band. When i=0~24, the power in each of the 25 critical bands is determined. The bark spectrum B(i) may be determined approximately by multiplying the peak spectral coefficient C(k) in each band by a certain coefficient.

Then, the bark spectrum B(i) is spread by the spreading function H(x) as follows:

$$S(i) = H(i)*B(i) \sum_{k=0}^{24} H(i-k) \cdot B(k) \quad i = 0\text{--}24 \tag{4}$$

where $$10\log_{10}H_{(i)} = 15.81 + 7.5(i+0.474) - 17.5[1+(i+0.474)^2]^{1/2}$$

The masking threshold level T(i) is then determined for each band in the spread spectrum domain as follows:

$$T(i) = 10^{\{logS(i) - (O(i)/10)\}} \tag{5}$$

O(i) in the above equation may be defined in any way so long as it is a function of i. However, it should be defined appropriately as the process of defining it affects the consumed bit rate and the quality of the sound.

The masking threshold level T(i) for each band in the spread spectrum domain is then converted into the masking threshold level Tn(i) in the frequency band domain. Instead of de-convoluting the masking threshold level T(i) in the spread spectrum domain, the masking threshold level T(i) in the spread spectrum domain is simply divided by the DC gain dg(i) of the spreading function to approximately determine the making threshold level Tn(i) in the frequency domain according to the following equation:

$$Tn(i) = \frac{T(i)}{dg(i)} \tag{6}$$

The masking threshold level Tn(i) in the frequency band domain is compared with an absolute threshold determined from a minimum audible level for each of the critical bands i, and the larger of the masking threshold and the absolute threshold is adopted as the masking threshold level Tn(i) for the band. The level of the minimum audible level curve is adjusted such that the minimum, in the vicinity of 3.4 kHz, of the minimum audible level curve is at a level corresponding to that of the least-significant bit (LSB) of a 16-bit PCM audio signal. This means that noise whose level is below the level of the LSB of a 16-bit PCM audio signal is permitted.

The masking threshold level Tn(i), determined as the noise power in each band, is converted into an RMS value per spectral coefficient according to the following equation:

$$Tb(i) = \sqrt{Tn(i)/\{u(i) - l(i) + 1\}} \tag{7}$$

In this embodiment, the RMS value determined for the present frame is compared with the RMS value determined for the preceding frame. In the following explanation, the RMS value for the preceding frame is indicated by Tbp(i), the RMS value for the present frame by Tbc(i), and the maximum allowable dB value by which the RMS value can fall in one frame by tc(i). The maximum allowable dB value tc(i) can be converted into the linearly-indicated ratio tcl(i) according to the following equation:

$$tcl(i) = 10^{tc(i)/20} \tag{8}$$

When Tbp(i)*tcl(i)<Tbc(i), i.e., when the RMS value for the present frame is greater than the allowable value, which is the RMS value of the previous frame multiplied by the maximum ratio by which the RMS value can fall in one frame, the value Tbc(i) is adopted as the RMS value for the present frame.

When Tbp(i)*tcl(i)≥Tbc(i), i.e., when the RMS value for the present frame is smaller than the allowable value, Tbp(i)*tcl(i), the RMS value of the previous frame multiplied by the maximum ratio by which the RMS value can fall in one frame, is substituted for Tbc(i) as the RMS value Tbc(i) for the present frame.

The above processing limits the amount by which the RMS value Tbc(i) of the present frame is allowed to fall relative to the RMS value Tbp(i) of the preceding frame. The maximum by which the value Tbc(i) can fall relative to Tbp(i) is defined by Tbp(i)*tcl(i). In other words, the masking threshold level of the present frame is not allowed to fall to a level greatly lower than the value of the masking threshold level of the previous frame. Because of this limiting, the noise level is kept high, and the consumed bit rate is lowered. Since the previous frame provides temporal masking, this higher noise level will not be aurally perceived when the resulting compressed signal is expanded and reproduced, even though the noise may be at a higher level than that at which it would be audible without temporal masking.

The following are examples of the maximum allowable dB values Tc(i) in the 25 critical bands:

| | | | |
|---|---|---|---|
| Tc(0) = −1, | Tc(1) = −1, | Tc(2) = −1, | Tc(3) = −2, |
| Tc(4) = −2, | Tc(5) = −2, | Tc(6) = −2, | Tc(7) = −2, |
| Tc(8) = −2, | Tc(9) = −2, | Tc(10) = −2, | Tc(11) = −2, |
| Tc(12) = −2, | Tc(13) = −2, | Tc(14) = −2, | Tc(15) = −2, |
| Tc(16) = −2, | Tc(17) = −3, | Tc(18) = −3, | Tc(19) = −3, |
| Tc(20) = −3, | Tc(21) = −3, | Tc(22) = −3, | Tc(23) = −3, |
| Tc(24) = −3. | | | |

As indicated above, the maximum allowable dB values are larger for critical bands of higher frequencies. Thus, the masking threshold levels of the bands at higher frequencies are able to follow, with fidelity, reductions in the level of the actual audio signal, and the masking threshold levels of the bands at lower frequencies follow, with the time constant imposed by the processing described above, reductions in the level of the actual audio signal. In this manner, the greater temporal masking ability of lower-frequency signals is effectively utilized. More specifically, the human sense of hearing has a wider critical bandwidth and a wider (poorer) frequency resolution at higher frequencies, and a higher time resolution (a better ability to follow temporal changes) at higher frequencies. Therefore, allowing the masking threshold at higher frequencies to fall by a greater extent between consecutive frames takes account of the shorter duration of temporal masking at higher frequencies, and the audio signal resulting from expanding the compressed signal will be perceived as having good aural characteristics.

The limited rate of change of the masking level will be briefly described below with reference to FIG. 4. It is assumed that an audio signal has the signal spectrum Ac in the present frame and the signal spectrum Ap in a past frame, i.e., the preceding frame as shown in FIG. 4, and that the masking threshold spectrum Mp (i.e., the masking threshold levels for all the bands) is established for the audio signal spectrum Ap in the preceding frame. Noise in the range below the masking threshold spectrum Mp will not be perceived as noise. The masking threshold spectrum Mc' indicated by the broken line is determined using the above equations (3)–(7) according to the simultaneous masking ability of the audio signal spectrum Ac in the present frame. It has heretofore been customary to regard the masking threshold spectrum Mc' as the masking threshold spectrum in the present frame. According to this embodiment, which takes the temporal masking effect of the signal spectrum Ap of the preceding frame into account, the masking threshold levels for the present and preceding frames are compared with each other in each band to establish the masking threshold spectrum Mc for the present frame. Noise in the range below the masking threshold spectrum Mc will not be perceived as noise. The masking threshold spectrum Mc is at a higher level than the masking threshold spectrum Mc'. Consequently, the difference in level between the masking threshold spectrum Mc' and the audio signal spectrum Ac is reduced, contributing to a reduction in the bit rate.

Figure 5:
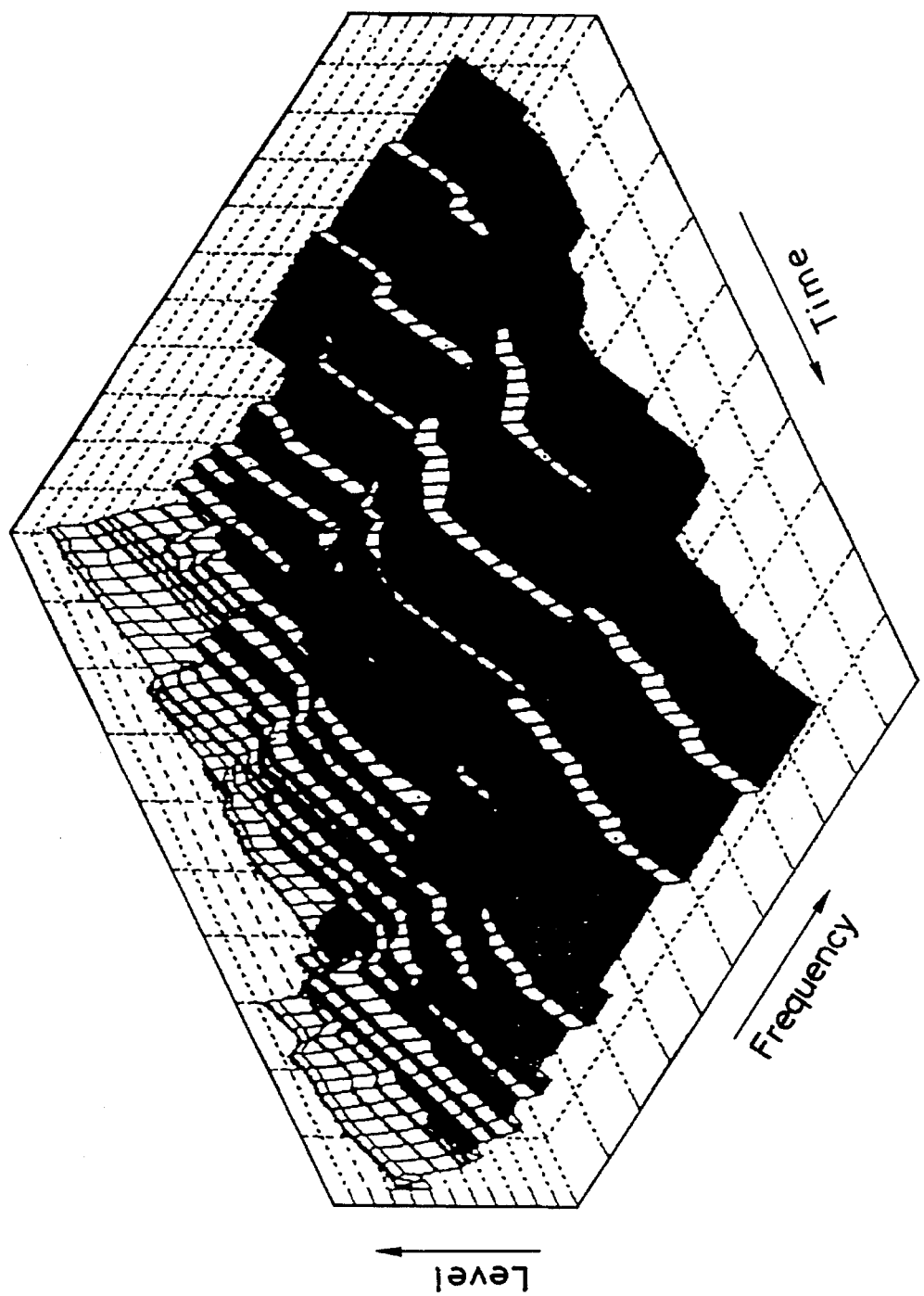
FIG. 5 is a diagram of frequency characteristics showing the manner in which the masking threshold level varies dynamically with frequency.

Masking threshold levels determined according to the present embodiment are shown in FIG. 5. FIG. 5 indicates that, towards lower frequencies, the rate at which the masking threshold level is allowed to change is reduced.

If the masking threshold level becomes higher, no limit is applied to the masking threshold level because such a limit would increase the bit rate.

Using the masking threshold level and the RMS value determined as just described, the bit allocation calculating circuit 7 calculates a bit allocation among the critical bands. If the peak level in each critical band is indicated by pk(i), then the bit allocation is calculated as follows:

$$bal(i) = nint\left( \log_2 \frac{pk(i)}{Tb(i)} \right) \qquad (9)$$

where nint indicates the nearest integer function.

The bit allocation calculating circuit 7 performs bit allocation according to bal(i) determined by the above equation (9). If it is necessary to keep the bit rate of the compressed signal constant, as is required if the compressed signal is to be recorded at a constant bit rate on a magnetic tape, then adjustments should be made to converge the integral of bal(i) to a certain range within a certain period of time. Such adjustments are, however, not required when the compressed signal is to be recorded in a solid-state storage medium such as a semiconductor memory.

Using the bit allocation according to bal(i), the spectral coefficients are quantized by linear quantizing, nonlinear quantizing, or vector quantizing. At this time, for increased quantizing efficiency, entropy coding may be effected on the index of the output of the adaptive quantizer 4. The entropy coding can additionally compress the output of the adaptive quantizer 4 by about 20%.

In addition to feeding the peak level in each band and the band energy B(i) to the main output terminal as they are, the masking threshold level and the RMS value that are fed as additional information to the additional information output terminal 9 may be subjected to inter-frame differential quantizing (DPCM) in the linear domain or the logarithmic domain, or to vector quantizing, to provide a further reduction in the bit rate. Since the above-described processing limits the rate at which the additional information can fall, the additional information is strongly correlated between frames. Therefore, applying differential quantizing or the like to the additional information can greatly reduce the bit rate.

The expander for expanding the compressed signal generated by the compressor shown in FIG. 2 will next be described with reference to FIG. 3. In the expander, the input terminal 11 receives the portion of the compressed signal transmitted from the main output terminal 8 of the compressor shown in FIG. 2, and the additional information input terminal 12 receives the additional information portion (the quantized threshold level and RMS value) of the compressed signal transmitted from the additional information output terminal 9 of the compressor shown in FIG. 2. The signal portions from the input terminals 11 and 12 are supplied to the adaptive inverse quantizer 13, which inversely quantizes them. The resulting inversely-quantized spectral coefficients are then supplied to the inverse MDCT circuit 14, which inversely orthogonally transforms them into blocks of samples in the time domain. The blocks of samples are supplied to the windowing/overlapping circuit 15, where they are overlapped to restore the original audio signal in the time domain. The audio signal is then supplied to the audio signal output terminal 16.

The processing the inversely-quantized portions of the compressed signal into blocks of samples in the time domain by the inverse MDCT circuit 14 will be described next. The samples y(n) of the signal in the time domain produced by the inverse MDCT are indicated as follows:

$$y(n) = \frac{2}{M} \sum_{k=0}^{\frac{M}{2}-1} C(k) \cos\left\{ 2\frac{\pi}{M} \left( k + \frac{1}{2} \right) \left( n + \frac{1}{2} + \frac{M}{4} \right) \right\} \quad (10)$$

where n is in a range of 0≦n≦M−1. The inversely-quantized spectral coefficients supplied to the inverse MDCT circuit 14 are processed by an inverse MDCT according to equation (10). Then, the resulting blocks of samples in the time domain are windowed and overlapped to provide the continuous digital audio output signal.

In the above embodiment, when the digital audio signal is compressed, the masking threshold level in the present frame is determined by referring to the masking threshold level in a past frame. However, the masking threshold level in the present frame may be calculated from the signal spectrum in the past frame, but calculating the masking threshold level in the present frame based on the masking threshold level in the past frame is simpler.

While the present invention is illustrated as being applied to the masking threshold level used for performing bit allocation to the spectral coefficients resulting from subjecting a signal to orthogonal transformation by an MDCT, the principles of the present invention are also applicable to coefficients resulting from other orthogonal transforms such as DCT, FFT, or the like, and to coefficients generated by subband coding.

The compressed signal resulting from the high efficiency compression performed by the compressor shown in FIG. 2 may be transmitted to the expander shown in FIG. 3 by any of various wire or radio transmission systems. The compressed signal may be recorded on any of various recording media, and then the recorded signal may be reproduced from the recording medium and thereafter expanded by the expander. At any rate, the transmission efficiency or recording efficiency of the signal is high as the bit rate is greatly reduced.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A method for compressing a digital audio signal to generate a compressed signal, the method comprising steps of:

deriving from frames of the digital audio signal plural spectral coefficients in a frequency domain, the frames of the digital audio signal including a present frame and a past frame;

determining a masking threshold level indicating aurally perceived noise taking account of temporal masking, the masking threshold level being determined by comparing relative levels of a present masking threshold level calculated using the spectral coefficients derived from the present frame and a past masking threshold level calculated using the spectral coefficients derived from the past frame;

quantizing the spectral coefficients derived from the present frame using a number of quantizing bits allocated among the spectral coefficients derived from the present flame in response to the masking threshold level determined in the determining step; and including in the compressed signal the spectral coefficients derived from the present frame and quantized in the quantizing step.

2. A method for compressing a digital audio signal to generate a compressed signal, the method comprising steps of:

deriving from frames of the digital audio signal plural spectral coefficients in a frequency domain, the frames of the digital audio signal including a present frame and a past frame;

calculating masking threshold levels indicating aurally-perceived noise-taking account of simultaneous masking by the spectral coefficients derived from the flames of the digital audio signal, the masking threshold levels including a present masking threshold level for the present frame, calculated using the spectral coefficients derived from the present frame, and a past masking threshold level for the past frame, calculated using the spectral coefficients derived from the past frame;

when the past masking threshold level multiplied by a predetermined ratio is equal to or greater than the present masking threshold level calculated in the calculating step, substituting the past masking threshold level multiplied by the predetermined ratio for the present masking threshold level as the present masking threshold level for the present frame to additionally take account of temporal masking in the present frame;

quantizing the spectral coefficients derived from the present frame using a number of quantizing bits allocated among the spectral coefficients derived from the present frame in response to the present masking threshold level; and including in the compressed signal the spectral coefficients derived from the present frame and quantized in the quantizing step.

3. The method of claim 2, wherein:

in the deriving step, the spectral coefficients are grouped by frequency into plural bands, the plural bands including a band, the band having a band frequency;

the calculating step calculates a present masking threshold level for the band and a past masking threshold level for the band using the spectral coefficients in the band; and in the substituting step:

a predetermined ratio is set for the band;

when the past masking threshold for the band, multiplied by the predetermined ratio for the band, is greater than or equal to the present masking threshold for the band, the past masking threshold for the band, multiplied by the predetermined ratio for the band, is substituted for the present masking threshold for the band as the present masking threshold level for the band, and the predetermined ratio for the band depends on the band frequency, the predetermined ratio for the band being less when the band frequency is towards higher frequencies than when the band frequency is towards lower frequencies.

* * * * *